United States Patent [19]
Itoh et al.

[11] 3,847,601
[45] Nov. 12, 1974

[54] REDUCED PELLETS FOR MAKING ALLOYS CONTAINING NICKEL AND CHROMIUM

[75] Inventors: Yohnosuke Itoh, Tokyo; Kozo Yokota, Yokohama; Tetsuya Watanabe, Fujisawa; Rokuro Matsui, Kawasaki, all of Japan

[73] Assignee: Nippon Yakin Kogyo Company Limited, Tokyo, Japan

[22] Filed: May 24, 1973

[21] Appl. No.: 363,619

[30] Foreign Application Priority Data
May 29, 1972 Japan.............................. 47-52527

[52] U.S. Cl......................... 75/130.5, 75/0.5, 75/3
[51] Int. Cl........................ C22c 33/00, C21b 1/08
[58] Field of Search............................ 75/3–5, 0.5, 75/130.5

[56] References Cited
UNITED STATES PATENTS

| | | | |
|---|---|---|---|
| 3,156,557 | 11/1964 | Dahl | 75/4 |
| 3,198,622 | 8/1965 | Herzog | 75/3 |
| 3,393,067 | 7/1968 | Alexander | 75/130.5 |
| 3,232,743 | 2/1966 | Anna | 75/3 |

Primary Examiner—L. Dewayne Rutledge
Assistant Examiner—Peter D. Rosenberg

[57] ABSTRACT

Sintered pellets for making alloys containing nickel and chromium, comprising 1 Wt. part of chrome iron ore, 1 to 10 Wt. parts of nickel silicate ore, and reducing agent having 1.05 to 1.30 gram-atom of carbon per 1 gram-atom of oxygen which is combined with iron, nickel, chromium and cobalt of the ores. The ingredients of the pellets are bound mostly by slag bondage. Iron ore or laterite ore may be added in the pellets. The pellets are sintered at 900°C to 1,400°C.

7 Claims, 11 Drawing Figures

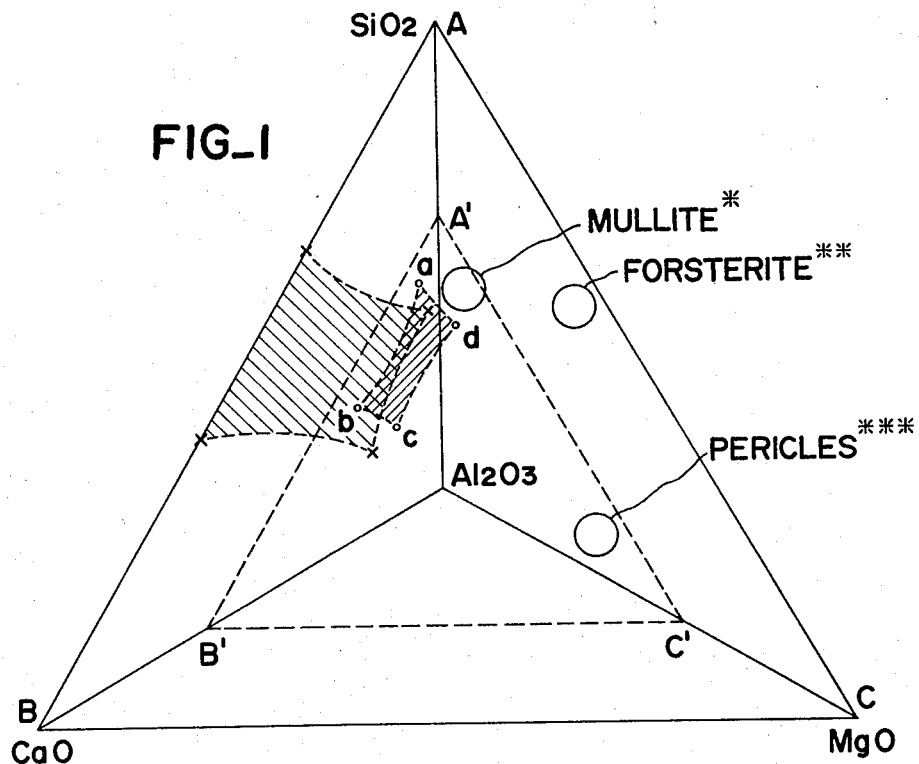

FIG_1

A-B-C   Isothermal equilibrium for ternary $SiO_2$-CaO-MgO system

A'-B'-C'   Isothermal equilibrium for quaternary $Al_2O_3$-CaO-$SiO_2$-MgO system with 10% $Al_2O_3$ X----X   Area for melting point at about 1500°C, corresponding to A-B-C ∘abcd∘   Area for melting point at about 1500°C, corresponding to A'-B'-C'

\* MULLITE corresponding to residual gangue obtained by reducing metals in laterite.

\*\* FORSTERITE corresponding to residual gangue obtained by reducing metals in nickel silicate ore.

\*\*\* PERICLES corresponding to residual gangue obtained by reducing metals in chrome iron ore.

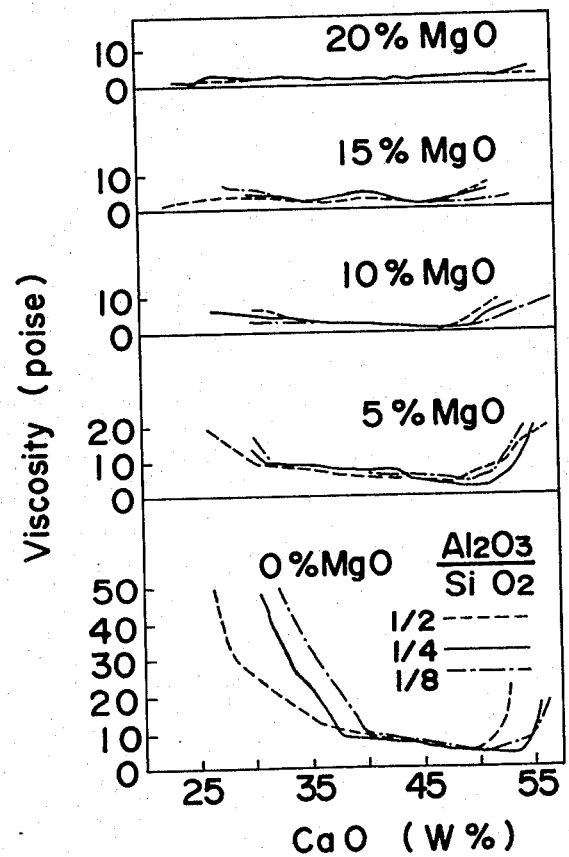
FIG_2

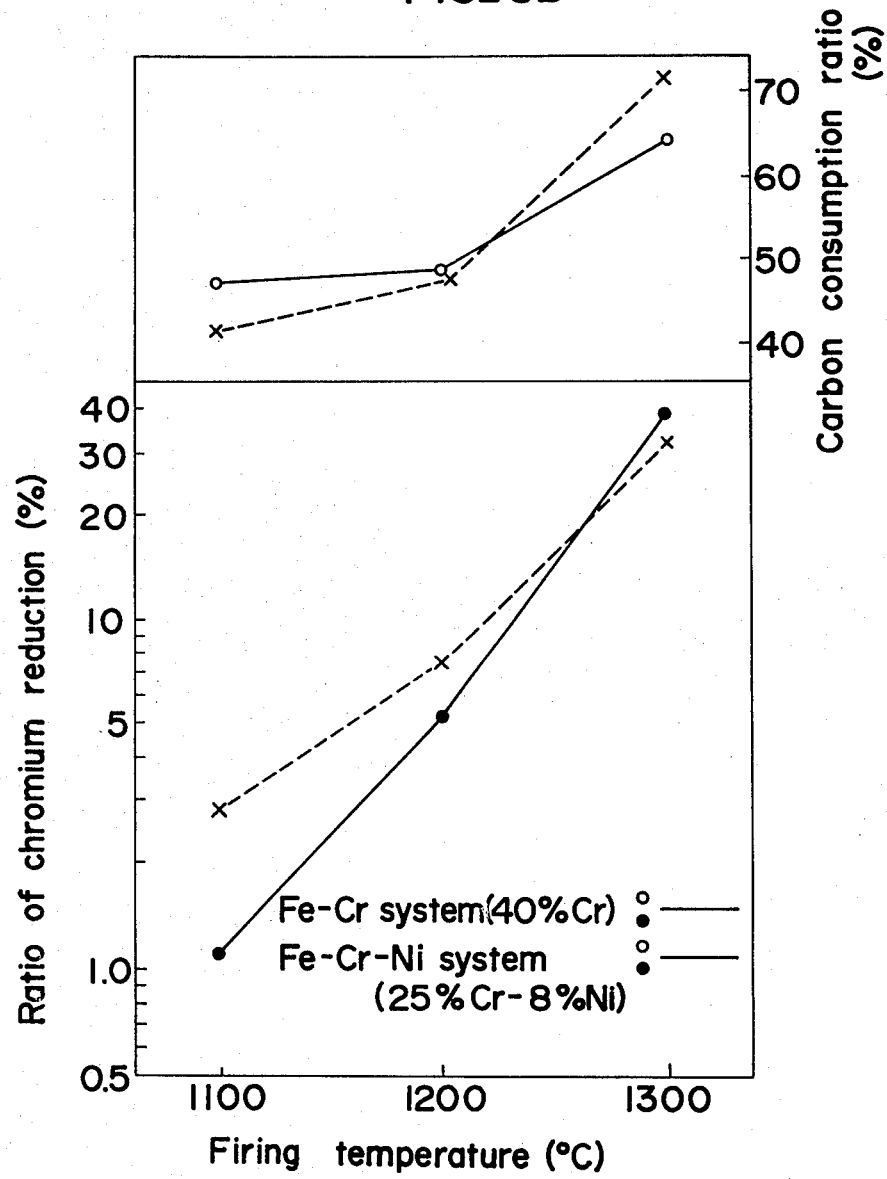

FIG_3C
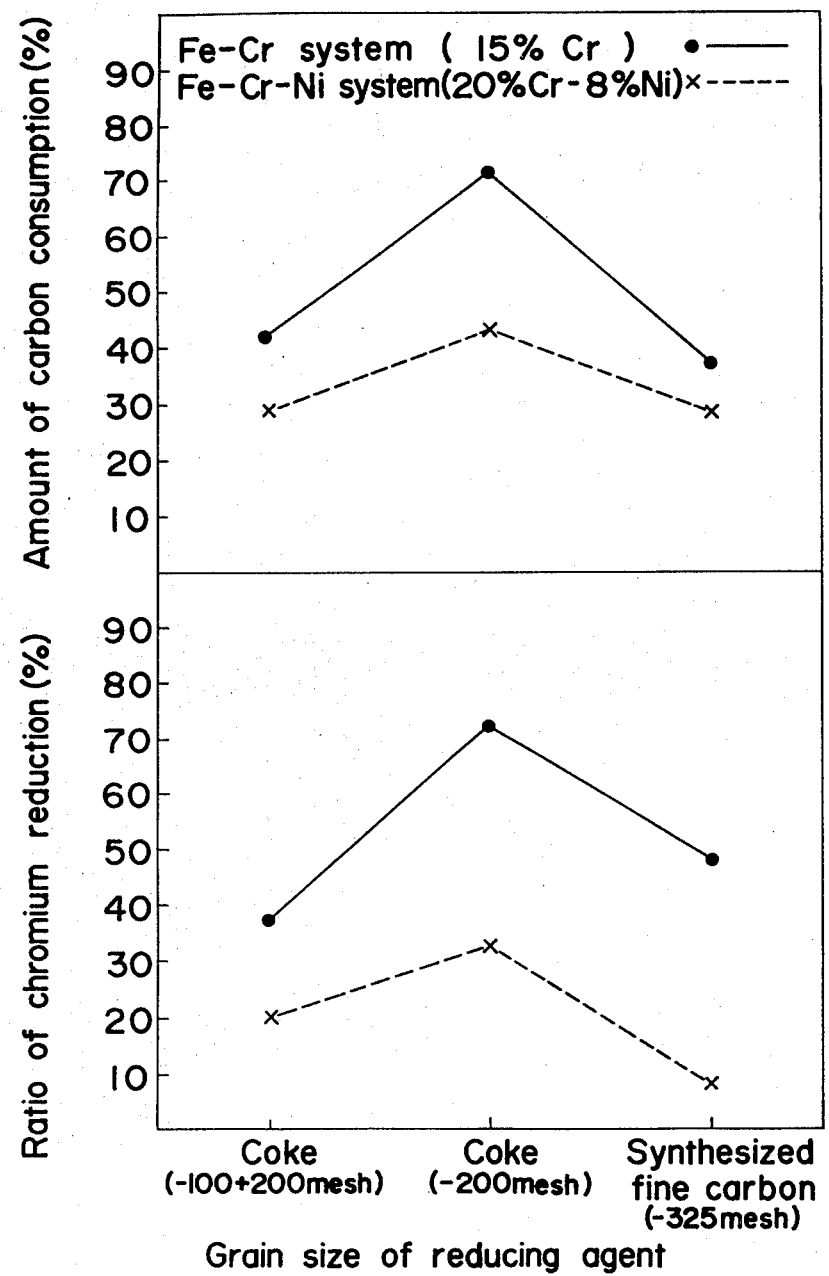

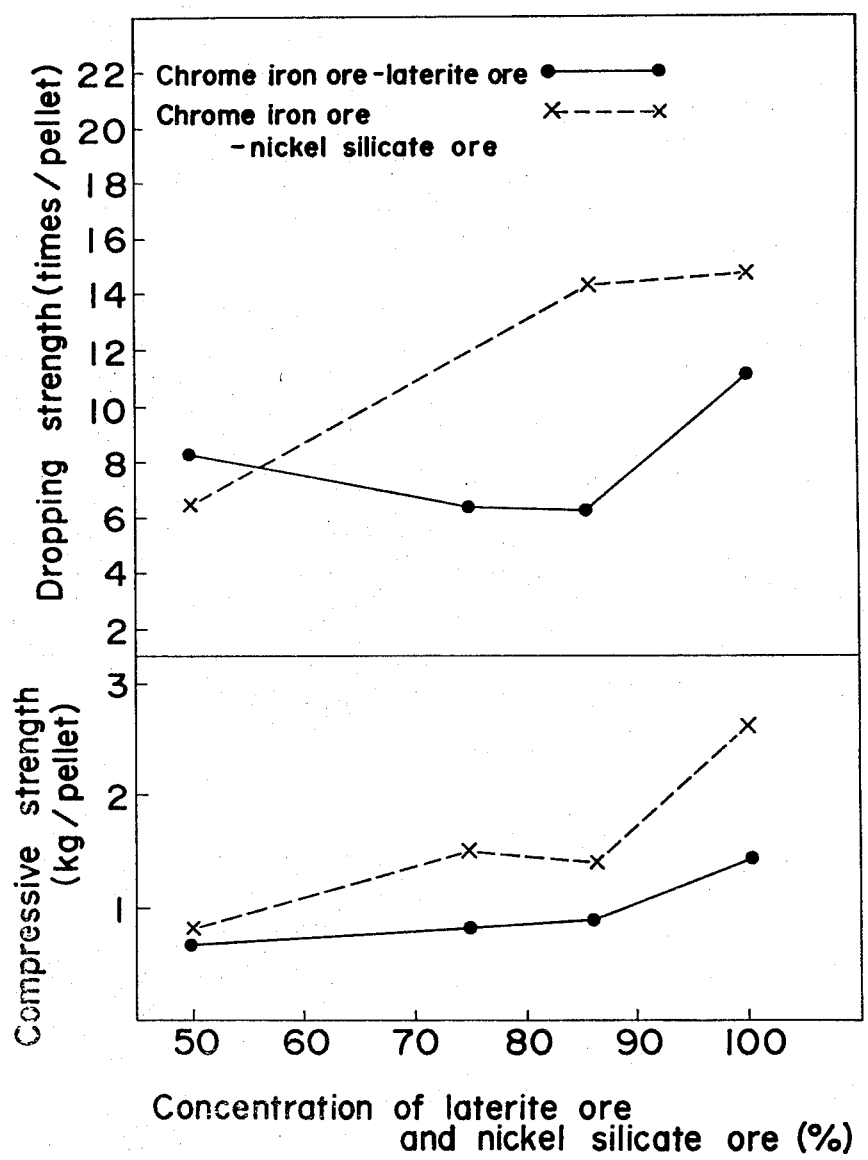
FIG_4

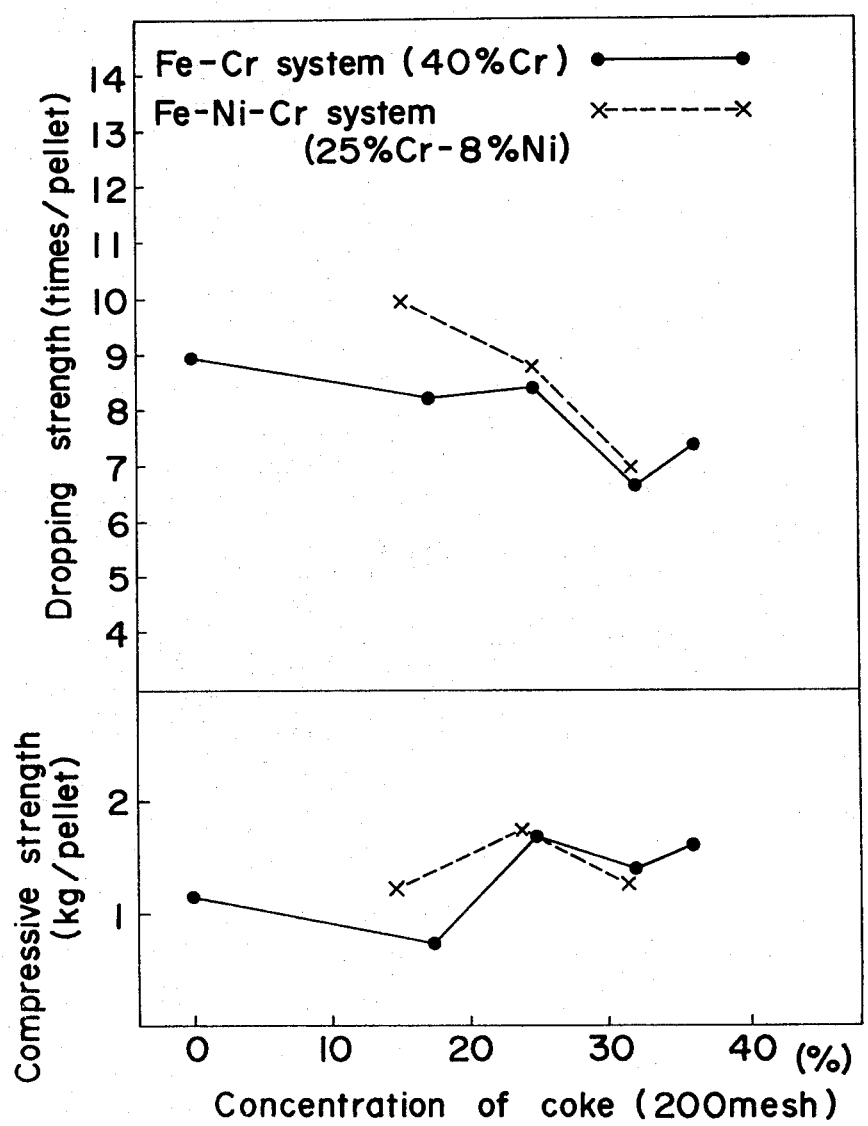
FIG_5

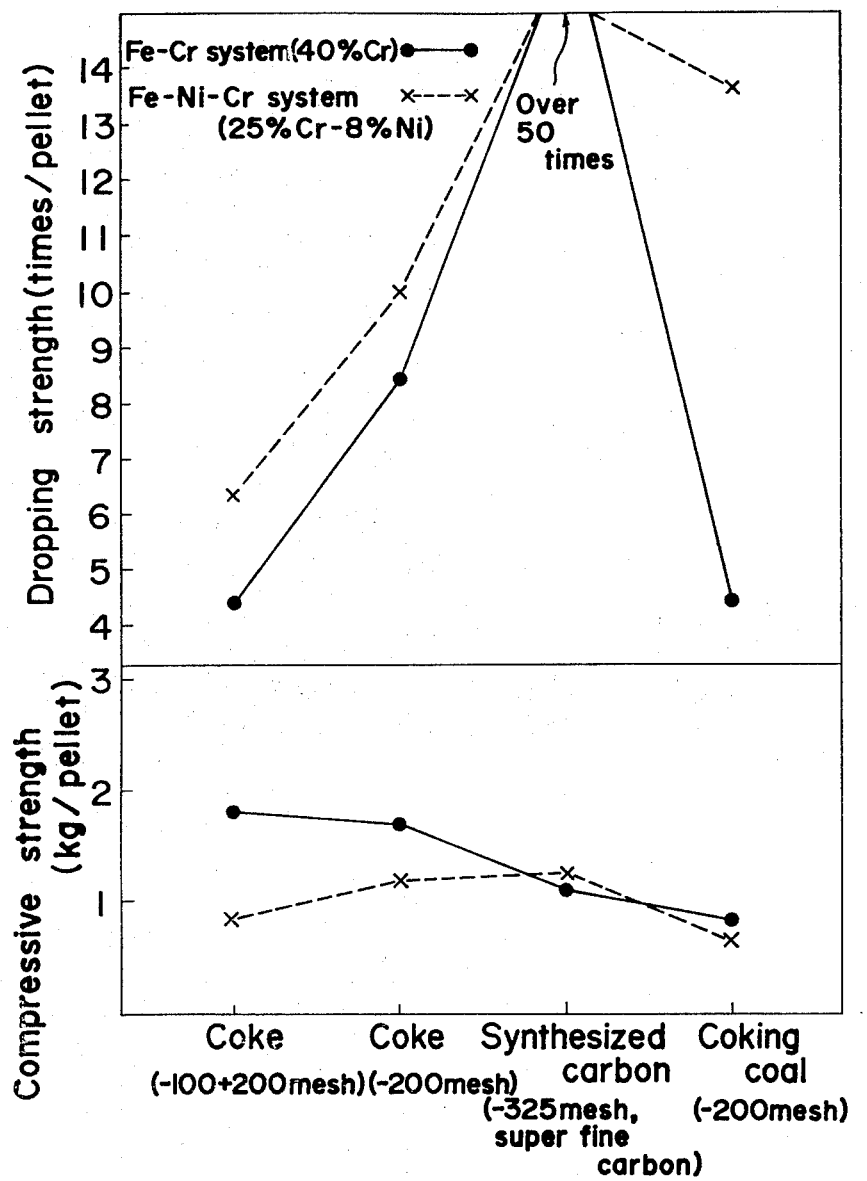
FIG_6

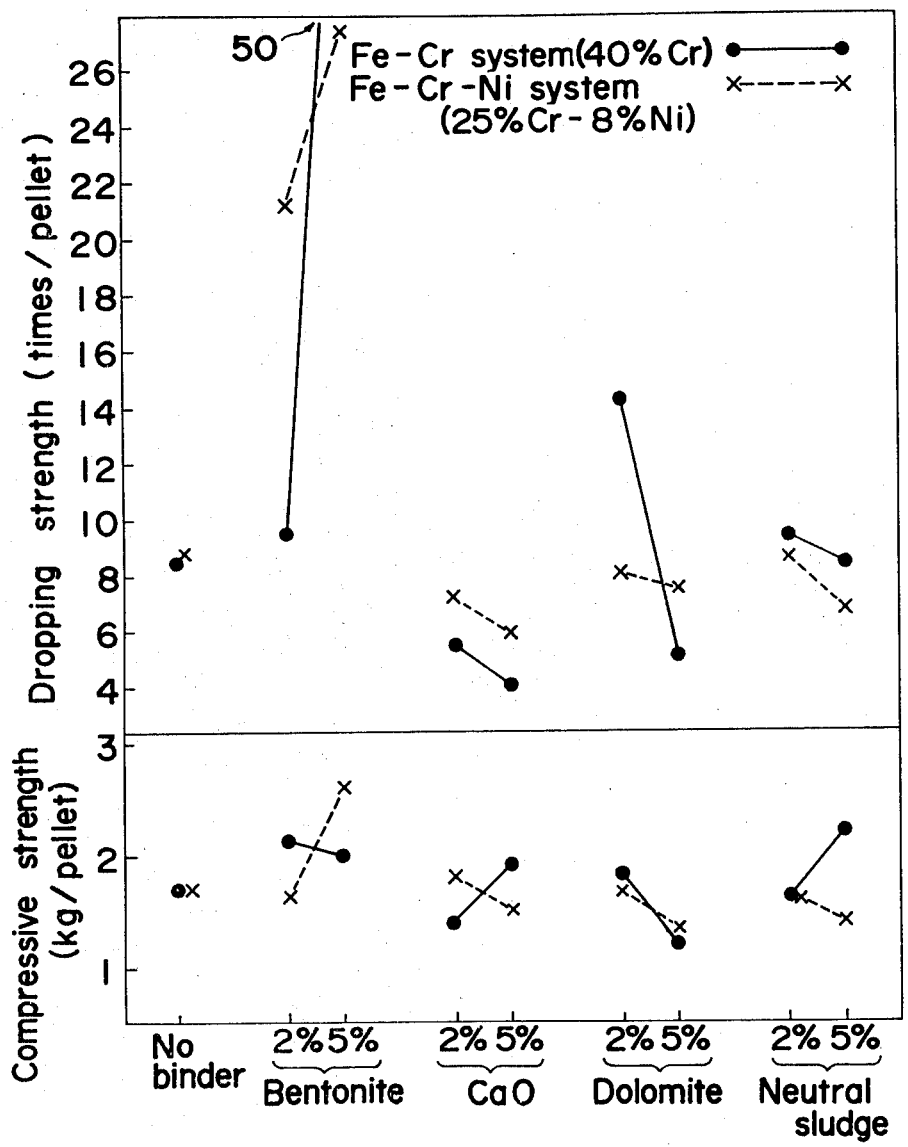
FIG_7

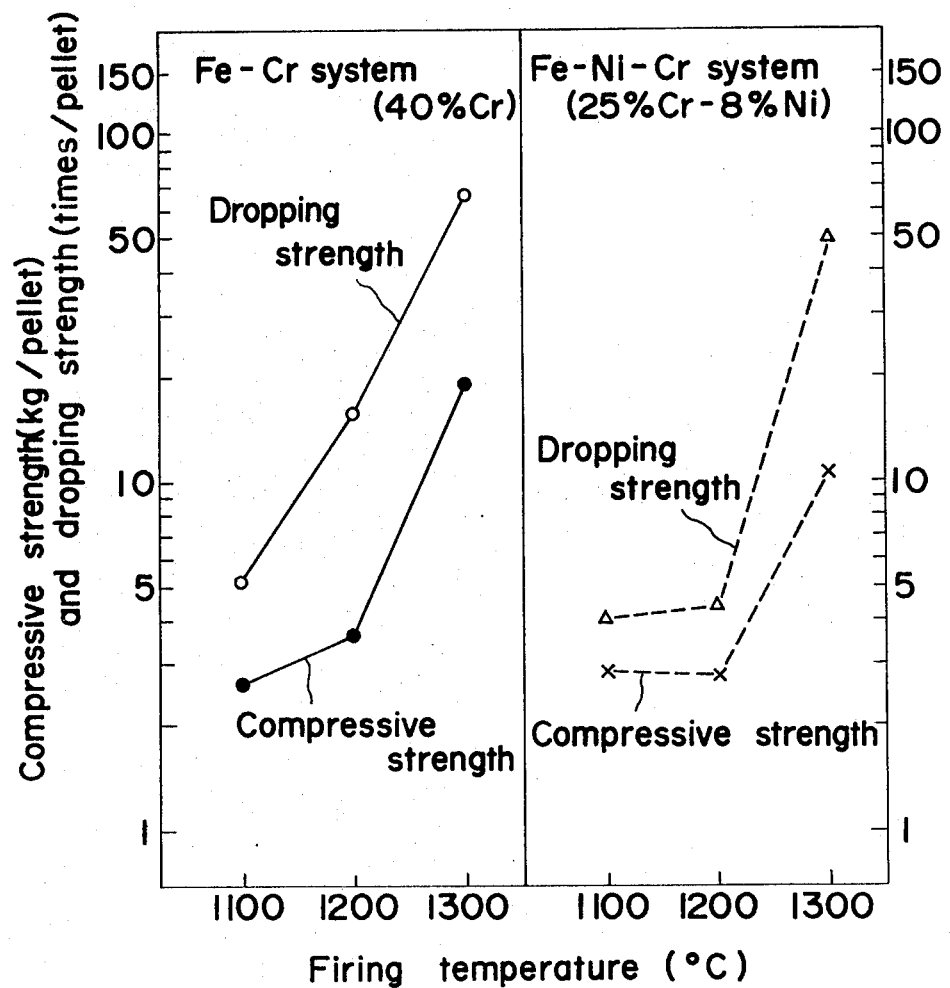
FIG_8

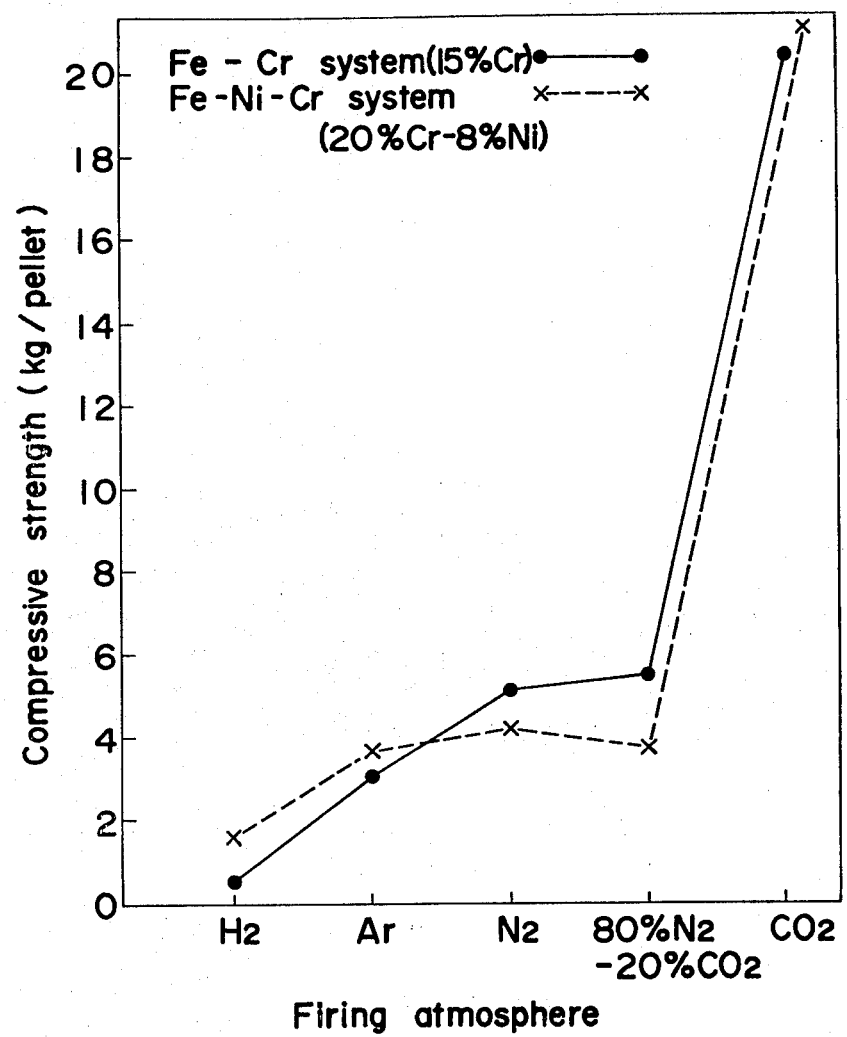
FIG_9

REDUCED PELLETS FOR MAKING ALLOYS CONTAINING NICKEL AND CHROMIUM

BACKGROUND OF THE INVENTION

1. Field of the Invention

This invention relates to reduced pellets for making alloys containing nickel and chromium, and more particularly to reduced pellets which facilitate the production of molten stainless steel through a simple melting process in a blast furnace or an electric furnace.

2. Description of the Prior Art

A typical alloy containing nickel and chromium is stainless steel. To produce stainless steel, ferro alloys which are separately prepared from starting ores are added to iron at a suitable ratio so as to achieve the desired steel composition. The main ingredients of stainless steel are conventionally made by the following steps.

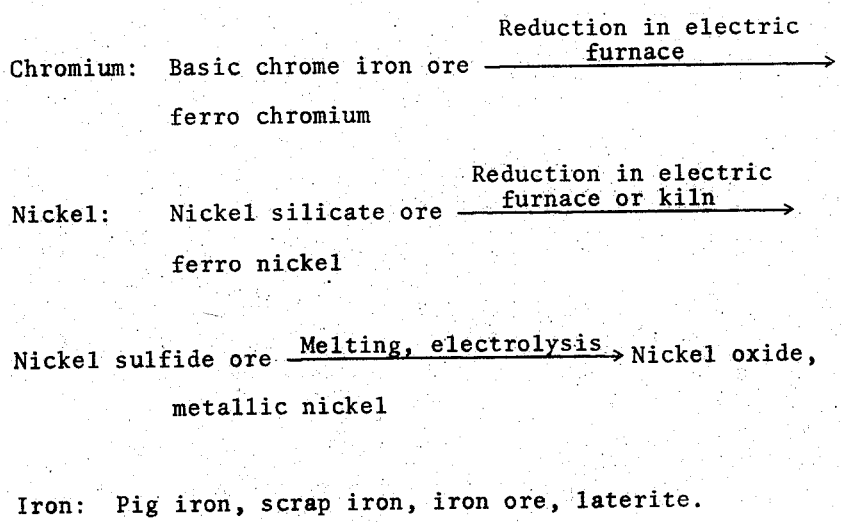

For the production of alloys containing nickel and chromium in the furnace, the following problems are foreseen.

a. As regards ores of chromium, basic chrome iron ore is currently used. Chrome iron ores of large blocks will become increasingly difficult to obtain, and it will be supplied in the form of fine ore and its grade will become lower.

b. As regards ores of nickel, there is a world-wide shortage. The applicants have used nickel silicate ores containing magnesium oxide (MgO) and silicon oxide ($SiO_2$), and only comparatively lower grade nickel silicate ores are now available.

c. To overcome the shortage of nickel silicate ores, the use of laterite has been proposed, but there are technical problems to be solved before practising it.

d. To do with chrome iron ores and nickel silicate ores of low grade, reduction of the ores must be effected at a high efficiency.

The present invention is to solve the aforesaid future problems, by providing reduced pellets containing nickel and chromium. The inventors have modified conventional pre-treating processes of ores, so as to directly produce the pellets of the invention from the starting ores.

More particularly, conventional pretreatment of chrom iron ores and nickel silicate ores includes oxidization of the ores by sintering or calcination thereof in a rotary furnace. In the case of chromium oxides, such conventional pretreatment amounts to a mere preheating or elimination of water of crystallization therefrom, because chromium oxide is difficult to reduce.

Therefore, an object of the present invention is to improve conventional pretreatment of ores for alloys containing nickel and chromium, so as to produce reduced pellets which are usable for production of such alloys, while meeting needs due to the foreseen shortage of natural resources.

SUMMARY OF THE INVENTION

According to the present invention, starting ores containing nickel and chromium are reduced or semi-reduced and made into the form of pellets, so as to facilitate the production of alloys containing nickel and chromium by simple melting of the pellets together with other materials of the alloys. Thus, a considerable saving can be made in the amount of energy which is necessary for melting and reducing the starting materials.

When the pellets of the present invention is applied to steel making, the formation of the reduced pellets can easily be incorporated in a continuous process of steel making, so as to minimize the energy necessary for obtaining the refined steel.

The reduced pellets of the present invention are featured in the following two points. Firstly, the formation of the starting ores into the shape of pellets facilitates the use of fine ores. Secondly, the formation of the pellets can easily be incorporated in a continuous steel making process; namely, a reducing agent is mixed in green pellets, as will be described hereinafter, so that the nickel and chromium materials in the green pellets are reduced by firing, and the reduced pellets can be hot charged in a furnace for the steel making process, whereby heat energy in the steel making is saved while ensuring the continuity of the process.

To produce the reduced pellets of the invention for alloys containing nickel and chromium, the following problems must be solved.

a. To produce reduced pellets of desired high grade, by using a simple composition consisting of chrome iron ore and nickel silicate ore and a reducing agent.

b. To find out the optimal rate of reduction of chromium and nickel in the reduced pellets and the optimal preheating temperature for firing the pellets, for optimizing the melting reduction for making the desired alloys.

c. To clarify the behaviors of metal oxides, gangues, and residual reducing agent in the reduced pellets at the time of the melting reduction for making the desired alloy.

As a result of numerous tests and experiments, the inventors have found out that the aforesaid problems can be solved by properly selecting the following factors.

i. Starting ores, and combination thereof including properties of the combination.
ii. Reducing agent.
iii. Reducing temperature.
iv. Reducing mechanism during firing.
v. Properties to the sintered pellets.

According to the present invention, there are provided sintered pellets for making alloys containing nickel and chromium, which reduced pellets comprise 1 part by weight of chrome iron ore, 1 to 10 parts by weight of nickel silicate ore, and at least one reducing agent containing 1.05 to 1.30 gram-atom of carbon per 1 gram-atom of total oxygen which is combined with iron, chromium, nickel and cobalt contained in the chrome iron ore plus the nickel silicate ore, said ingredients of the pellets being bound together mostly by slag bondage.

The present invention provides a process of producing reduced pellets for making alloys containing nickel and chromium, comprising steps of mixing 1 part by weight of chrome iron ore, 1 to 10 parts by weight of nickel silicate ore, and at least one reducing agent containing 1.05 to 1.30 gram-atom of carbon per 1 gram-atom of total oxygen which is combined with iron, chromium, nickel and cobalt contained in the chrome iron ore plus the nickel silicate ore, pelletizing the mixture thus formed into green pellets, and firing the green pellets at 900°C to 1,400°C so as to reduce chromium and nickel while building various ingredients thereof mostly by slag bondage which is produced during the firing.

With the reduced pellets of the present invention, it is possible to add up to 10 parts by weight of iron ore and/or laterite ore therein, per 1 part by weight of the chrome iron ore and the nickel silicate ore. In this case, the amount of carbon in the reducing agent should be 1.05 to 1.30 gram-atom per 1 gram-atom of total oxygen combined with iron, chromium, nickel and cobalt contained in said chrome iron ore, said nickel silicate ore, and said iron ore and/or laterite.

BRIEF DESCRIPTION OF THE DRAWING

For a better understanding of the invention, reference is made to the accompanying drawing, in which:

FIG. 1 is a isothermal equilibrium diagram of manganese oxide - silicon oxide - calcium oxide - aluminum oxide system;

FIG. 2 is a graph of the viscosity of the system of FIG. 1 for different concentrations of the ingredients thereof;

FIGS. 3A to 3C are graphs showing the ratio of carbon consumption and the ratio of chromium reduction for different reducing conditions;

FIG. 4 is a graph showing the mechanical strength of green pellets for different compositions thereof;

FIG. 5 is a graph similar to FIG. 4, illustrating the strength of the green pellets for different concentrations of coke therein;

FIG. 6 is a graph similar to FIG. 4, illustrating the strength of the green pellets for different reducing agents therein;

FIG. 7 is a graph similar to FIG. 4, illustrating the strength of the green pellets for different binders added therein at different concentrations;

FIG. 8 is a graph, illustrating the variation of the mechanical strength of the reduced pellets of the present invention; and FIG. 9 is a graph similar to FIG. 8, illustrating the strength of the reduced pellets for different reducing atmospheres.

DETAILED DESCRIPTION OF THE PREFERRED EMBODIMENTS

Figure 3A:
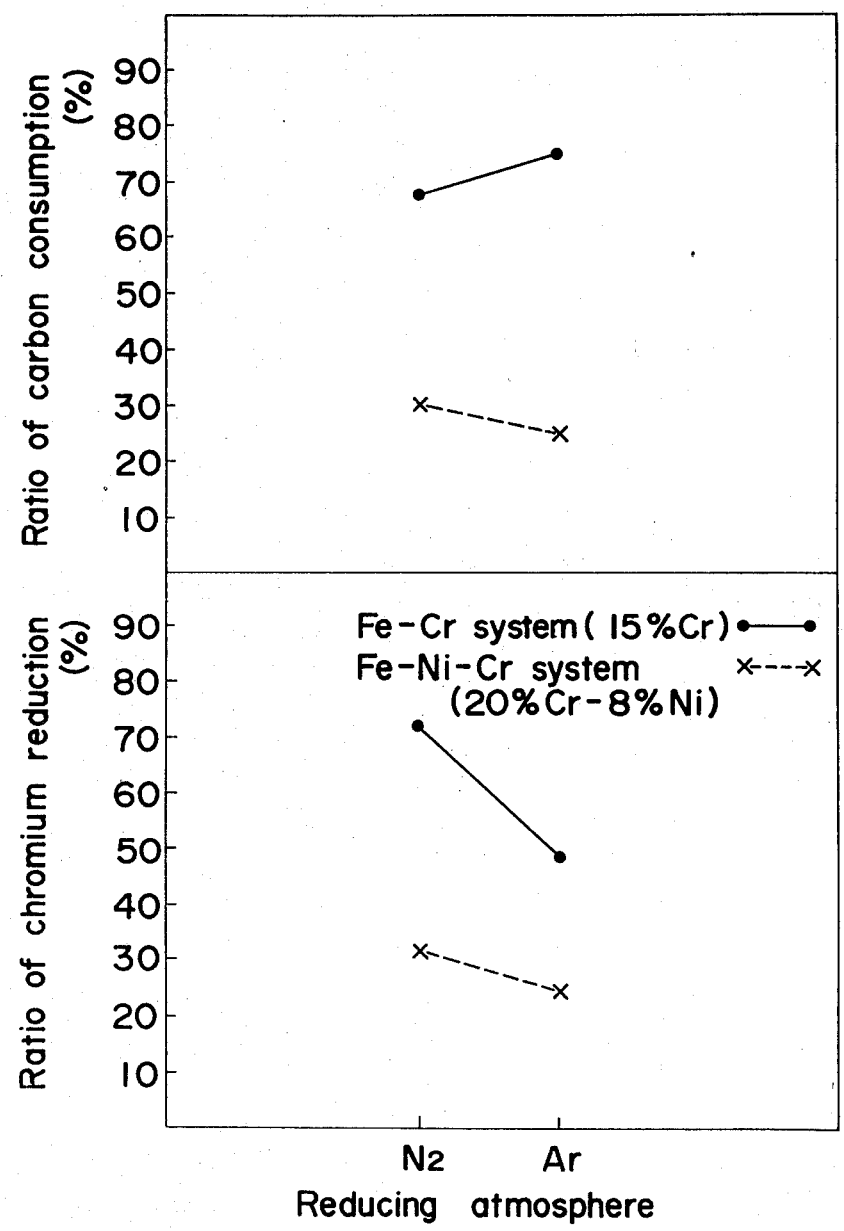

Various factors which contribute to the accomplishment of the present invention will now be described.

1. Starting ores and Combination Thereof

Table 1 shows the chemical compositions of typical starting ores to be used in reduced pellets of the present invention. The scope of the present invention, however, is not restricted by the specific compositions of the Table 1.

Table 1

| Ore | Total Fe (%) | Cr (%) | Ni (%) | $SiO_2$ (%) | MgO (%) | $Al_2O_3$ (%) | CaO (%) |
|---|---|---|---|---|---|---|---|
| Nickel silicate ore | 7.0–15 | 2.0 or less ($Cr_2O_3$) | 1.5 or more | 30–50 | 20–35 | 3.0 or less | 2.0 or less |
| Chrome iron ore | 5 or more | 30 or more | — | 5 or less | 8–25 | 5–15 | — |
| Laterite ore | 40 or more | 1.5 or more | 0.5 or more | 15 or less | 5 or less | 3–10 | — |
| Iron ore | 45 or more | — | — | 25 or less | 1 or less | 4 or less | 1 or less |

The combination or the ores of Table 1 is determined by considering the following factors.

a. In the case of producing molten steel of iron-nickel-chromium system, a suitable combination of gangues should be selected so as to include magnesium oxide, silicon oxide, and aluminum oxide in the pellets.

b. The amounts of the gangues should be related to the rate of reduction of iron, nickel, and chromium in the reducing process, as will be described hereinafter, in such a manner that slag bondage is effected in the pellets.

c. In the case of reduced pellets containing quaternary magnesium oxide - silicon oxide - aluminum oxide - calcium oxide slag system, the melting properties of the reduced pellets in an electric furnace or a blast furnace should be considered in conjunction with the chemical composition of the molten metal.

More particularly, the reducing process of the aforesaid factor (b) is related to the reducing temperature to be explained hereinafter. In the reduced pellets of the invention, it is not intended to totally reduce chromium oxide which is hardly reduceable, while nickel and iron will be totally reduced. It is intended to use slag bondage in the pellets. In selecting the combination of the ores, the aforesaid factor (c) plays a major role: namely, the pellets should have optimal characteristics which include optimal softening point and melting point, especially the pellets should be melted satisfactorily at a low temperature. The reduction of chromium oxide should be effectively carried out in a blast furnace or in an electric furnace.

The combination of the starting ores is selected, based on the melting point of the reduced pellets to be formed by the combination, while considering the isothermal equilibrium diagram (1,500°C) of the quaternary magnesium oxide - silicon oxide - calcium oxide - aluminum oxide system, as shown in FIG. 1, and the viscosity of the quaternary slag at the time of melting, as shown in FIG. 2.

Referring to FIG. 2, when it is desired to melt at 1,500°C (the actual refining temperature is slightly higher than 1,500°C, e.g., 1,600°C to 1,700°C), if the concentration of magnesium oxide in the quaternary slag is high, the slag viscosity is substantially constant, regardless of the concentration of calcium oxide. As can be seen from Table 1, the starting ores to be used in the present invention have a comparatively low concentration of calcium oxide. Accordingly, to select a proper slag composition in the pellets of the present invention, it is sufficient to consider the ternary silicon oxide - magnesium oxide - aluminum oxide system of FIG. 1. In FIG. 1, the area $\overline{abcd}$ represents the range of compositions for a melting point of 1,500°C, provided that the aluminum oxide ($Al_2O_3$) concentration thereof is 10 percent. If the starting ores of laterite, nickel silicate ore, and chrome iron ore of Table 1 are used, the concentrations of such starting ores in the pellets for achieving the aforesaid slag composition are as shown in FIG. 1.

To achieve the compositions in the area $\overline{abcd}$, the following measures are taken.

i. The desired slag composition in the area $\overline{abcd}$ may be obtained by selecting a proper combination of the chrome iron ore and the nickel silicate ore.

ii. To achieve the slag composition of the area $\overline{abcd}$, laterite ore and iron ore, especially laterite ore, may be utilized. In this case, nickel and chromium which are contained in the laterite ore can be also advantageously utilized.

iii. The preceding measure i and ii are selectively used, while considering the desired composition of the chromium-nickel-iron steel. For instance, in the case of the steel with a high chromium concentration, the measure i will be used (the iron from the nickel silicate ore and the chrome iron ore alone will be sufficient). On the other hand, in the case of the regular 18-8 stainless steel, the preceding measure ii is utilized.

Consequently, the composition of the starting ores is so selected as to comprise 1 part by weight of chrome iron ore and 1 to 10 parts by weight of nickel silicate ore. If a high iron concentration in the pellets is desired, up to 10 parts by weight of iron ore and/or laterite ore may be selectively added in the starting composition, based on the total weight of the chrome iron ore and the nickel silicate ore.

When the laterite ore is added, the melting point of the slag is greatly reduced, as can be seen from FIG. 1.

The viscosity of the slag is important, because in the case of the reduced pellets of the invention having a comparatively high gangue concentration, it affects the electric properties at the time of melting thereof in an electric furnace.

2. Reducing Agent

In mixing a reducing agent in the pellets of the present invention, the following points must be considered.

a. Carboneous materials are intrinsically hydrophorbic, so that the addition of the carboneous materials tends to deteriorate the pelletizing properties and to reduce the mechanical strength thereof.

b. Carboneous materials contain an inevitable amount of volatile ingredients, and such volatile ingredients may cause the pellets to decay in the course of firing the pellets for reduction. Despite the aforesaid difficulties, the pellets of the present invention must contain a reducing agent for providing reduced pellets.

One may think of gas reduction, instead of the addition of the reducing agent, for obviating the aforesaid difficulties. The gas reduction, however, is restricted to the dispersion from the surface of the pellets, and the desired rate of reduction cannot be achieved without the addition of the reducing agent, in the pellets per se.

To mitigate the aforesaid difficulties, the inventors have taken the following measures.

Firstly, clay is added in the pellets, which clay is contained in the nickel silicate ore, such as garnierite. Due to the presence of the clay, carboneous reducing agents can be used in the pellets of the invention. An excessive amount of carboneous materials is, however, undesirable, because the presence of a large volume of volatile substance in the pellets may cause the pellets to decay while being fired.

Secondly, gangues contained in the starting ores of the pellets produce slag bondage in the course of firing for reduction thereof. Due to the slag bondage, a high mechanical strength of the reduced pellets can be ensured, despite the addition of the carboneous reducing agent therein.

Some example of the reducing agent which can be used in the pellets of the present invention are coke breeze, coking coal, pitch tar, graphite (natural and artificial), and natural coke.

The concentration of the reducing agent in the pellets of the invention is determined in the following manner.

With the present invention, iron, nickel, and chromium which are contained in the form of metal oxides in the starting ores should be reduced, and the concentration of the reducing agent can be determined from the needs for this purpose. Accordingly, the reducing agent in the pellets of the invention is so selected that carbon contained therein amounts 1.05 to 1.30 gram-atom per 1 gram-atom of oxygen combined with iron, nickel, chromium and cobalt in the aforesaid metal oxides.

With such concentration of the reducing agent, the following effect can be achieved. FIG. 3 illustrates the chromium reduction rate and carbon consumption rate of iron-chromium pellets and iron-nickel-chromium pellets of the invention, when they are reduced in nitrogen gas atmosphere and argon gas atmosphere. As apparent from the figure, with the iron-nickel-chromium system of the invention, the carbon consumption rate is low, yet a comparatively high chromium reduction ratio can be achieved. As a result, with the invention, the cost of coke is minimized.

3. Reducing Temperature

The inventors have found that the firing temperature for reducing green pellets, to be described hereinafter, should preferably be in a range of 900°C to 1,400°C. The rate of reduction may be increased by firing at a high temperature, and the efficiency of reducing in a melting process may be improved by preheating the pellets. The maximum firing temperature for the reduction at 1,400°C was determined by considering the following factors: namely, that the chrome iron ore to be used in the invention is hard to melt and has a high softening point, that the addition of the carbonaceous material in the pellets tends to raise the softening point, and that the temperature at which the reduction of the chromium oxide starts is fairly high.

4. Reducing Mechanism of the Pellets

In the pellets of the present invention, carbonaceous reducing material is added therein and the pellets are fired at 900°C to 1,400°C, so that the metal oxides including the comparatively stable chromium oxide are reduced in the following manner.

The reduction of the iron oxide is initially carried out by the direct contact of the carbonaceous reducing agent and the iron oxide and then by carbon monoxide gas, which is generated by the chemical reaction between the carbonaceous material and the atmospheric air.

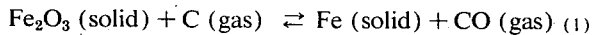
$Fe_2O_3$ (solid) $+ C$ (gas) $\rightleftarrows$ $Fe$ (solid) $+ CO$ (gas) \hfill (1)
$C$ (gas) $+ O_2$ (gas) $\rightleftarrows$ $CO$ (gas) \hfill (2)
$CO_2 + C \rightarrow CO$ \hfill (3)

Thermodynamically speaking, the reaction of the equation (1) begins at 800°C, and the carbon monoxide in the equations (2) and (3) is stabilized at a temperature above 700°C.

As a result, the reduction of the iron oxide is mostly carried out by the carbon monoxide gas.

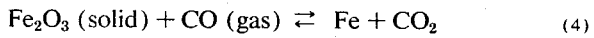
$Fe_2O_3$ (solid) $+ CO$ (gas) $\rightleftarrows$ $Fe + CO_2$ \hfill (4)

The chromium oxide is directly reduced by carbon at about 1,200°C, but its reduction by the carbon monoxide gas is not so active as in the case of iron oxide.

$Cr_2O_3 + C \rightleftarrows Cr_7C_3 + CO$ \hfill (5)
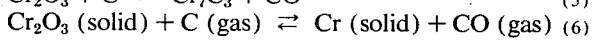
$Cr_2O_3$ (solid) $+ C$ (gas) $\rightleftarrows$ $Cr$ (solid) $+ CO$ (gas) \hfill (6)

Thus, the chromium in the iron-chromium-nickel system in the pellets of the invention is mostly reduced by direct reduction by carbon at a high temperature, so that the efficiency of the chromium reduction may be improved by increasing the active surface area of the carbonaceous reducing material in the pellets.

The reduction of the chromium oxide begins at a temperature of about 1,200°C, and the inventors have found out that consumption of the carbonaceous reducing material in the course of heating the pellets to that temperature is comparatively small, and loss of the carbonaceous material by combustion in the regular atmosphere is small. This seems to be caused by the presence of a large amount of gangues consisting of stable oxides in the starting ores.

5. Properties of the Pellets

The properties of the pellets of the aforesaid composition according to the present invention, at different stages of manufacture, are as follows.

GREEN PELLETS

A pelletizer is used to shape the starting materials into the form of pellets. The pellets as formed by the pelletizer, which contain about 10 percent to 15 percent of moisture, are referred to as "green pellets." The physical properties of the green pellets are expressed in terms of breakdown strength of an individual pellet of a given grain size and the times of dropping it from a given height until its breakdown. Such physical properties of dry pellets are particularly important, so that the properties of the green pellets will be described together with those of the dry pellets.

DRY PELLETS

The green pellets are not suitable for firing, due to the presence of a large amount of moisture therein. Accordingly, prior to firing, the green pellets are pretreated by natural drying or by artificial drying with a dryer. The pellets thus dried are referred to as "dry pellets."

To make the reduced pellets of the present invention, both the chemical and the physical properties of the dry pellets are important. On the other hand, the so-called oxidizing pellets do not require strict chemical properties, although they are required to have a high mechanical strength. The difference of the pellets of invention from the oxidizing pellets is in the firing of the pellets for reduction.

Mechanical strengths of specimens of green pellets and dry pellets were measured. The results are shown in FIGS. 4 to 7. FIG. 4 illustrates the mechanical strength of the green pellet specimens for different starting ores at different concentrations. It may be concluded from FIG. 4 that, with the starting ores indicated therein, the mechanical strength of the green pellets does not depend on the kinds and concentrations of the starting ores.

FIGS. 5 and 6 illustrate the mechanical strength of the pellets of the invention for different concentration of coke therein and for different reducing carbonaceous material therein. One may think that the carbonaceous material to be added in the pellets of the invention has a poor "wetting" properties, so that the addition of such carbonaceous material may deteriorate bondage between particles forming the individual pellets. However, as shown in FIG. 5, concentration of the carbonaceous material in the pellets does not seriously affect the mechanical strength of the pellets. It was found that the dropping strength of the pellets considerably increases as the grain size of the carbonaceous material is decreased.

FIG. 7 illustrates the effect of different binders, e.g., bentonite, on the mechanical strengths of the green pellets.

REDUCED PELLETS

The reduced pellets according to the present invention, which are produced by firing the aforesaid dry pellets, are continuously fed into a blast furnace or an electric furnace, so as to be melted together with other materials of the desired alloy. Therefore, the pellets should not be broken or swollen while being fed into the furnace, because broken fine powders of the pellets may hamper smooth continuous feeding of the pellets. Since the pretreatment of the ores by pelletization is to ensure the smooth continuous feed thereof, the final product of the reduced pellets should have a high mechanical strength, as in the case of the dry pellets.

Furthermore, the reduced pellets of the invention should have a high thermal and chemical stability when being placed in the blast furnace or an electric furnace.

In the case of oxidized pellets of iron ores, which are industrially used as a source of iron ore for blast furnaces, their mechanical strength before being fed into the furnace is about 150 Kg/pellet, but once being placed in the furnace, they are subjected to chemical reduction which leads to swelling and foaming thereof until their mechanical strength becomes as low as 4 to 16 Kg/pellet. When the pellets reach bosh portion of the blast furnace, where high-temperature reduction is completed, a high mechanical strength is recovered by metallic bondage and hematite bondage. Thus, in the case of oxidized pellets, those properties which perform quick reduction and re-sintering on a high-temperature side are more preferable than those which starts the reduction at a low temperature while causing the swelling.

On the other hand, the present invention relates to reduced pellets, which are chemically stable until the pellets are heated to that temperature at which they are reduced. Accordingly, what matters in the present invention is the behavior of the pellets in a temperature range from the firing temperature thereof for the reduction to a melting point in the furnace. The following risks can be foreseen in the pellets of the invention at the aforesaid temperature range.

a. As the pellets are heated to a temperature above the firing temperature thereof, the reaction between the carboneous materials and the oxides is actuated, so that the carboneous material in the pellets is consumed.

As a result, porosity of the pellets increases, and there is caused a risk of swelling thereof.

b. In the case of the pellets of the invention containing a comparatively large amount of gangues, there is a risk of hanging, or fusion of adjacent pellets. This is because such pellets may be softened at the high temperature, and the softened pellets tend to be fused together as being fed into the furnace, due to the weights of other materials which are fed therein simultaneously therewith.

c. As the reducing reaction proceeds, a large amount of reaction gas is generated, which tends to cause a risk of the swelling of the pellets.

In short, the foreseen risks relate to the swelling, fusing, and gas generation. Thus, the pellets of the present invention should be provided with a high stability against such risks. The inventors have found out that the softening point and the high-temperature strength of the pellets are important, as far as the aforesaid stability is concerned.

Tests were made by making specimens of the pellets of the invention which had different concentrations of ingredients. The properties of the test specimens were checked by applying them to resistance melting in an electric furnace. The results are shown in Table 2.

Table 2

| Composition of the pellets | | | | Softening point | Hang-* ing | Electric* conductivity |
|---|---|---|---|---|---|---|
| Chrome iron ore | Nickel silicate ore | Laterite (part) | Carboneous material (excess %) | | | |
| 1** | — | 1 | 25 | About 1700°C | C | C |
| 1 | 1 | 1 | 25 | About 1350°C | B | B |
| 1 | 3 | 1 | 25 | About 1350–1400°C | B | A |
| 1 | 5 | 1 | 25 | About 1400°C | A | A |
| 1 | 7 | 1 | 25 | About 1400°C | A | A |
| 1** | — | 2 | 25 | About 1700°C | C | C |
| 1 | 1 | 2 | 25 | About 1300–1350°C | B | B |
| 1 | 3 | 2 | 25 | About 1300–1350°C | B | B |
| 1 | 5 | 2 | 25 | About 1350–1400°C | A | A |
| 1 | 7 | 2 | 25 | About 1400°C | A | A |

\* A represents satisfactory operation; B represents less satisfactory operation than A; and C represents unacceptable condition.
\*\* Reference specimen, not in the scope of the invention.

As apparent from Table 2, when the pellets are made only by iron source laterite and chrome iron ore, their softening point is very high, i.e., about 1,700°C due to the chemical composition, as already shown in FIG. 1. Furthermore, the hanging and electric conductivity properties of such binary pellets are poor.

On the other hand, the pellets of the invention containing nickel silicate ore have a suitable softening point, and their hanging and electric conductivity properties are satisfactory. With the pellets of the invention, it is noticed that the softening point increases with the increase of the concentration of the nickel silicate ore, and that the softening point decreases with the increase of the laterite concentration therein. Such properties also restrict the concentrations of the different ingredients in the pellets of the present invention.

Further tests were made on the mechanical strength, the reduction rate, and the reducing mechanism of the pellets of the present invention. The following results were reached.

i. Mechanical strength of the reduced pellets. Dry pellets were reduced in a chest-type Elema furnace at 1,100°C to 1,300°C in different atmospheres.

Special attention is paid to the cracking temperature of the water of crystallization and the heating speed in the proximity of 700°C. No decay of the pellets was noticed for any compositions of the pellets. The maximum firing temperature was 1,300°C, and satisfactory reduction took place without causing any softening or melting. This was because the presence of chrome iron ore having a high softening point and the presence of the carboneous material added therein.

FIG. 8 shows the relation between the reducing temperature and the mechanical strength of the pellets. FIG. 9 shows the relation between the reducing temperature and the mechanical strength of the pellets. FIG. 9 shows the relation between the mechanical strength of the pellets and the reducing atmosphere, for the case of reducing at 1,200°C. For all the ternary iron-chromium-nickel systems, practical and useful mechanical strength for the pellets to be melted can be obtained simply by firing at 900°C to 1,300°C. As regards the atmosphere for the reduction, an oxidizing atmosphere produced better mechanical strength than reducing atmosphere and neutral atmosphere did. However, the use of the oxidizing atmosphere is not desirable, because it tends to deteriorate the reduction rate. For industrial applications, it is technically difficult to use a firing temperature higher than 1,400°C.

ii. Reduction ratio.

The reduction ratio of the metal oxides in the firing is shown in FIGS. 3A, 3B, 3C, for different firing temperatures and different reducing atmospheres, while considering the grain size of the added carboneous material and the reduction ratio of chromium oxide.

As can be seen from the figures, the reduction ratio increases with the firing temperature, while the consumption ratio of carboneous material is kept substantially constant. The reason for such behaviour seems to be the fact that the binding is mostly effected by the slag bondage and the slag composition is of ternary iron-nickel-chromium system.

iii. Analysis of the reduction mechanism.

The slag bondage in the pellets of the invention, as pointed out above, was analyzed by X-ray diffraction. Table 3 shows the result of X-ray diffraction for metals in the reduced pellets. As apparent from Table 3, the chromium ore is hardly reduced at temperatures below 1,200°C (reduction ratio of less than 10 percent), regardless of the reducing time in a range of 30 minutes to 180 minutes. Generation of some chromium carbide ($Cr_7C_3$) was noticed. At 1,300°C, any noticeable reduction took place for short firing, but as the duration of the firing became longer, the reducing effect was enhanced. Thus, firing at 1,300°C or higher is necessary for pre-reduction of the chrome iron ore.

On the other hand, considerable reduction of laterite took place at 1,100°C to 1,300°C, and the heating at 1,100°C proved to be sufficient for this purpose because higher temperatures did not improve the reduction ratio.

In comparing the ternary iron-nickel-chromium system and the binary iron-chromium system, the addition of the nickel silicate ore somewhat increased the peak for silicon oxide, which might be due to cracking reduction of fayalite ($2FeO \cdot SiO_2$). According to the result of the X-ray diffraction tests, chromium was substantially non-existent up to 1,300°C, and $\alpha$ iron was a major ingredient. Firing at 1,300°C caused reduction of chromium to produce iron-chromium system. As the temperature rised, the metals tended to agglomerate, and at about 1,400°C, the pellets mostly became metallic.

Firing at 1,100°C for reduction initiated agglomeration of $\alpha$ iron, and the agglomeration was accelerated at 1,300°C. At 1,300°C, the reduction of chromium was not progressed, but iron-chromium metallic system was formed. The amount of nickel was small, but it was present in the form of iron-chromium-nickel system.

Iron and chromium particles thus reduced were enclosed by silicate, and the pellets were bound by slag bondage. When the firing temperature was further raised to about 1,400°C, metallic bondage was found, but the binding mechanism of the pellets was slag bondage. Thus, the maximum reducing temperature was restricted to 1,400°C.

Table 3

| | Composition | | Firing temperature (°C) | $\alpha Fe+(Ni)$ | $FeO \cdot Cr_2O_3$ | $SiO_2$ | $Cr_7C_3$ | FeCr |
|---|---|---|---|---|---|---|---|---|
| Fe-Ni-Cr system | Nickel silicate ore + (50%) | Chrome iron ore (50%) | 1,100 | | +++++ | | | |
| | | | 1,200 | + | ++++ | + | | |
| | | | 1,300 | | ++ | + | | |
| | Nickel silicate ore + (55%) | Chrome iron ore (15%) | 1,100 | +++ | ++ | ++ | | |
| | + Laterite (20%) | | 1,200 | ++++ | ++ | ++ | | |
| Fe-CR system | Chrome iron ore + large (50%) | Laterite small (50%) | (1) 1,100 | ++ | ++++ | | | |
| | | | (2) 1,200 | +++ | ++ | + | + | |
| | | | (3) 1,300 | | + | | ++ | +++ |
| | Chrome iron ore + small (50%) | Laterite large (50%) | 1,100 | ++++ | + | + | | |
| | | | 1,200 | +++++ | + | + | | |
| | | | 1,300 | ++++ | + | + | ++ | + |

Notes: The "+" mark represents diffraction intensity.
Specimens (1), (2), and (3) were fired for 3 hours, but all the other specimens were fired for 30 minutes.

The invention will now be described in further detail, by referring to Examples.

EXAMPLE 1

Reduced pellets of the present invention were prepared by mixing chrome iron ore, nickel silicate ore, and laterite ore, as shown in Table 4, adding coke of the same Table so as to provide 1.25 gram-atom of carbon per 1 gram-atom of total oxygen combined with iron, nickel, chromium and cobalt in the mixture of the ores, pelletizing the mixture into green pellets, and drying and reducing the green pellets at different temperatures. The compressive strength and the dropping strength of the reduced pellets thus formed were measured. The results are shown in Tables 5 and 6, respectively.

EXAMPLE 2

Green pellets were formed by crashing and mixing 340 Kg of nickel silicate ore of Table 4, 440 Kg of chrome iron ore of the same table, and 596 Kg of coke of the same table, and pelletizing the mixture thus prepared. The green pellets were processed into reduced pellets by drying and firing them in a rotary kiln at 1,100°C.

The reduced pellets thus fired were hot charged into a submerged arc furnace, so as to produce an iron alloy by resistance heating the charge at 1,550°C for reducing the residual chromium oxide. Thereby, 933 Kg of molten alloy was obtained, whose composition was as shown in Table 7.

Table 4

|  | $Fe_2O_3$ | Ni+CO | $Cr_2O_3$ | $SiO_2$ | MgO | $Al_2O_3$ | Loss at high temperature | CaO | C |
|---|---|---|---|---|---|---|---|---|---|
| Nickel silicate ore | 12.2 | 2.7 | 0.8 | 42.4 | 28.8 | 0.5 | 10.1 | 0.1 | — |
| Chrome iron ore | 20.1 | 0.2 | 49.8 | 2.8 | 17.9 | 10.0 | 5.0 | 1.6 |  |
| Laterite |  | 0.7 | 3.9 | 11.2 | 1.0 | 6.9 | 11.5 | 0.2 | — |
| Coke | — | — | — | — | — | — |  | 81.5 |  |

Table 5

Compressive strength (Kg/pellet)

| Magnetite | Chrome iron ore | Laterite | Nickel silicate ore | Green pellets | Dry pellets | Firing temperature (°C) | | | | | | |
|---|---|---|---|---|---|---|---|---|---|---|---|---|
|  |  |  |  |  |  | 700 | 1,100 | 1,200 | 1,250 | 1,300 | 1,350 | 1,400 |
|  | 1 | 1 |  | 4.9 | 20.8 | 20.7 | 20.0 | 40.0 |  | 33.9 | 83.8 | × |
|  | 1 | 2 |  | 5.2 | 23.1 | 19.9 | 24.7 | 47.8 | 194.5 | × |  |  |
|  | 1 | 3 |  | 4.6 | 20.9 | 19.7 | 23.9 | 36.1 | 16.5 | × |  |  |
|  | 1 | 4 |  | 3.5 | 22.6 | 10.6 | 24.8 | 42.3 | 7.9 | × |  |  |
|  | 1 | 1 | 1 |  | 21.5 | 17.6 | 21.6 | 29.2 |  | 170.5 | × |  |
|  | 1 | 1 | 3 | 5.1 | 25.6 | 19.6 | 31.9 | 32.9 |  | 190.4 | × |  |
|  | 1 | 1 | 5 | 6.1 | 29.7 | 26.1 | 41.9 | 58.3 |  | 121.0 | 180.0 | × |
|  | 1 | 1 | 7 | 5.6 | 28.9 | 20.9 | 35.9 | 37.0 |  | 79.2 |  | 237.0 |
|  | 1 | 2 | 1 | 7.8 | 23.0 | 19.9 | 22.6 | 37.8 |  | 70.8 | × |  |
|  | 1 | 2 | 3 | 5.4 | 26.0 | 17.6 | 29.6 | 31.2 |  | 151.0 | × |  |
|  | 1 | 2 | 5 | 4.5 | 29.4 | 20.8 | 30.8 | 31.5 |  | 128.0 | 217.4 |  |
|  | 1 | 2 | 7 | 5.3 | 19.1 | 11.5 | 24.9 | 24.6 |  | 66.0 |  | × |
|  | 1 | 8 |  | 5.4 | 18.5 | 17.8 | 21.4 | 72.7 |  | × |  |  |
| 8 | 1 |  |  | 4.6 | 15.2 | 44.7 | 220.0 | 177.0 |  |  |  |  |

Table 6

Number of times of dropping to an iron plate from a height of 40 cm. until breakdown of the pellet

| Magnetite | Chrome iron ore | Laterite | Nickel silicate ore | Green pellets | Dry pellets | Firing temperature (°C) | | | | | | |
|---|---|---|---|---|---|---|---|---|---|---|---|---|
|  |  |  |  |  |  | 700 | 1,100 | 1,200 | 1,250 | 1,300 | 1,350 | 1,400 |
|  | 1 | 1 |  | 50 up | 33.2 | 50 up | 50 up | 50 up |  | 50 up | 50 up |  |
|  | 1 | 2 |  | 50 up | 45 up | 41.2 up | 50 up | 50 up | 50 up | — | — |  |
|  | 1 | 3 |  | 50 up | 38.8 up | 47.4 up | 50 up | 50 up | 46 up | — | — |  |
|  | 1 | 4 |  | 50 up | 47.6 up | 29.0 | 50 up | 50 up | 11 up | — | — |  |
|  | 1 | 1 | 1 | 50 up | 49.2 up | 50.0 up | 50 up | 50 up | — | 50 up | — |  |
|  | 1 | 1 | 3 | 50 up | 45.0 up | 50.0 up | 50 up | 50 up | — | 50 up | — |  |
|  | 1 | 1 | 5 | 50 up |  | 50.0 up | 50 up | 50 up | — | 50 up | 50 up |  |
|  | 1 | 1 | 7 | 50 up | 49.4 up | 50.0 up | 50 up | 50 up | — | 50 up |  | 50 up |
|  | 1 | 2 | 1 | 50 up | 50.0 up | 50.0 up | 50 up | 50 up | — | 50 up |  |  |
|  | 1 | 2 | 3 | 50 up | 43.8 up | 50.0 up | 50 up | 50 up | — | 50 up |  |  |
|  | 1 | 2 | 5 | 50 up | 48.6 up | 50.0 up | 50 up | 50 up | — | 50 up |  |  |
|  | 1 | 2 | 7 | 50 up | 38.4 | 50.0 up | 50 up | 50 up | — |  |  |  |
|  | 1 | 8 |  | 50 up |  | 48.0 up | 50 up | 50 up | 50 up |  |  |  |
| 8 | 1 |  |  | 50 up | 6.0 | 50.0 up | 50 up | 50 up |  | 50 up |  |  |

Table 7

| Carbon | Silicon | Chromium | Nickel | Iron |
|--------|---------|----------|--------|------|
| 3.1%   | 4.9%    | 15.2%    | 16.3%  | Balance |

It should be noted that the melting point of the mixture of the pellets of the invention and the other alloying material in the submerged arc furnace was lower than the melting point of the chrome iron ore alone. Thus, low-temperature operation is made possible, so as to ensure smooth flow of slag. The yields of chromium, nickel, and iron through the aforesaid process were approximately 93, 99, and 99 percent, respectively.

The molten alloy having a composition of Table 7 was scooped into a ladle, so as to reduce the silicon content thereof by the silicon thermit process, which silicon in the submerged arc furnace was excessively reduced by 4.9 percent. After adding 112 Kg of chrome iron ore in the ladle, it was heated by a flame of heavy oil to a temperature of about 1,400°C.

To accelerate the reduction of chromium, 114 Kg of quick lime in the ladle for raising the basicity of the molten alloy, and then the melt was agitated by a pad. As a result, the silicon content in the molten alloy was reduced from 4.9 to 2.1 percent, as shown in Table 8.

Table 8

| Carbon | Silicon | Chromium | Nickel | Iron |
|--------|---------|----------|--------|------|
| 2.9%   | 2.1%    | 17.7%    | 15.8%  | Balance |

The yields of nickel, chromium, and iron from the reduced melt in the submerged arc furnace to the refined melt in the ladle proved to be approximately 99, 96, and 96 percent, respectively.

With the pellets according to the present invention, the presence of nickel silicate ore results in a slag which is rich in silicon oxide ($SiO_2$). As a result, the yield of chromium is improved.

More particularly, as the pellets of the invention melt, their high content of silicon oxide produces a high acidity, and a high electric resistance. Thereby, the temperature in the furnace tends to become higher, so as to get an improved operation.

Furthermore, the silicon oxide in the slag layer is reduced to metallic silicon by the carbon contained therein. The metallic silicon in the slag acts to reduce chromium oxide at the boundary between the molten metal and slag, so that the yield of chromium can be improved.

$$Cr_2O_3 + Si \rightleftarrows SiO_2 + Cr \qquad (7)$$

For the chemical reaction of the equation (7), there is an equilibrium of the following equation (8).

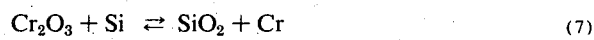

Here,
$^aSiO_2$: Activity of silica
(Cr): Amount of chromium contained in the slag
[Cr]: Amount of chromium contained in the metal As apparent from the equation (8), an operation using a large amount of silicon oxide is advantageous, as far as the yield of chromium is concerned.

In the foregoing description, the reduced pellets of the present invention were prepared by forming green pellets by a pelletizer, and firing the green pellets. The present invention, however, is not restricted to such a process of making the reduced pellets. For instance, starting ores in the shape of powder may be formed into slurry by adding water therein, and the desired reduced pellets may be continuously generated by successively feeding the slurry into a rotary kiln. The reduced pellets thus generated can also be used for making alloys containing nickel and chromium.

A test of the last mentioned continuous process was made by using the following starting materials.

| | |
|---|---|
| Chrome iron ore | 50 Kg |
| Laterite ore | 50 Kg |
| Nickel silicate ore | 350 Kg |
| Coke powder | 30 Kg |

The starting materials were mixed together and hot crashed to a grain size of not greater than 100 mesh. Water was added in the crashed material so as to give a moisture of 30 percent, and after thorough agitation for homogenization, the moisture was reduced to 10 percent or less by a filter. The moisture controlled mixture was dried and fired in a test kiln.

The test kiln was 4 m long, with an entrance temperature of about 700°C and an outlet temperature of about 1,200°C. The firing time, taken from loading of the kiln to removal of the products therefrom, was 4 hours. For the test run, the process was not continuous, but it could be continuous.

The output from the test kiln was sifted by a screen of 5 mm mesh, so as to separate powder particles from pellets usable as a material for making alloys containing nickel and chromium. The yield of the pellets was 85 percent.

The mechanical strength of the pellets thus formed by the test kiln happened to be somewhat inferior to those of the preceding Examples, but there is a room for improvement.

We claim:

1. Reduced pellets for making alloys containing nickel and chromium, consisting essentially of a mixture of 1 part by weight of chrome iron ore, 1 to 10 parts by weight of nickel silicate ore, and at least one reducing agent containing 1.05 to 1.30 gram-atom of carbon per 1 gram-atom of total oxygen which is combined with iron, nickel, chromium and cobalt of the chrome iron ore plus the nickel silicate ore, said mixture having been fired at a temperature of 900°C to 1,400°C to effect reduction and sintering of said ores to bind together said ingredients of the pellets mostly by slag bondage.

2. A process of producing reduced pellets for making alloys containing nickel and chromium, comprising steps of mixing 1 part by weight of chrome iron ore, 1 to 10 parts by weight of nickel silicate ore, and at least one reducing agent containing 1.05 to 1.30 gram-atom of carbon per 1 gram-atom of total oxygen which is combined with iron, nickel, chromium and cobalt of the chrome iron ore plus the nickel silicate ore, pelletizing the mixture thus formed into green pellets, and firing the green pellets at 900°C to 1,400°C so as to reduce chromium and nickel while binding various ingredients thereof mostly by slag bondage which is produced during the firing.

3. Reduced pellets according to claim 1 and further comprising up to 10 parts by weight of at least one third ore selected from the group consisting of iron ore and laterite ore, based on 1 part by weight of the total of the chrome iron ore and the nickel silicate ore, wherein said amount of carbon in said reducing agent is 1.05 to 1.30 gram-atom per 1 gram-atom of total oxygen combined with iron, nickel, chromium, and cobalt of the chrome iron ore, said nickel silicate ore, and said at least one third ore.

4. A process of producing an alloy containing iron, nickel, and chromium, comprising steps of mixing 1 part by weight of chrome iron ore, 1 to 10 parts by weight of nickel silicate ore, and at least one reducing agent containing 1.05 to 1.30 gram-atom of carbon per 1 gram-atom of total oxygen which is combined with iron, nickel, chromium and cobalt of the chrome iron ore plus the nickel silicate ore, pelletizing the mixture thus formed into green pellets, firing the green pellets at 900°C to 1,400°C so as to reduce chromium and nickel while binding various ingredients thereof mostly by slag bondage which is produced during the firing, and melting the pellets thus obtained together with starting alloying elements for the alloy in a melting furnace, so as to obtain a melt of the alloy.

5. A process according to claim 4 and further comprising a step of adding oxides containing chromium and iron for removing excess amount of reduced silicon in the melt.

6. A process according to claim 2, wherein said amount of carbon in said reducing agent is 1.05 to 1.30 gram-atom per 1 gram-atom of total oxygen combined with iron, nickel, chromium, and cobalt of the chrome iron ore, said nickel silicate ore, and up to 10 parts by weight of at least one third ore selected from the group consisting of iron ore and laterite ore, based on 1 part by weight of the total of the chrome iron ore and the nickel silicate ore.

7. The process according to claim 4, wherein said amount of carbon in said reducing agent is 1.05 to 1.30 gram-atom per 1 gram-atom of total oxygen combined with iron, nickel, chromium and cobalt of the chrome iron ore, said nickel silicate ore, and up to 10 parts by weight of at least one third ore selected from the group consisting of iron ore and laterite ore, based on 1 part by weight of the total of the chrome iron ore and the nickel silicate ore.

* * * * *